Jan. 26, 1960  B. CARLIN  2,922,999
NUISANCE CONTROL TECHNIQUE AND APPARATUS THEREFOR
Filed April 17, 1956

INVENTOR
BENSON CARLIN

BY
Kenyon & Kenyon
ATTORNEYS

United States Patent Office 2,922,999
Patented Jan. 26, 1960

2,922,999

NUISANCE CONTROL TECHNIQUE AND APPARATUS THEREFOR

Benson Carlin, Fair Lawn, N.J., assignor to Alcar Instruments, Inc., Little Ferry, N.J., a corporation of New Jersey Application April 17, 1956, Serial No. 578,672

4 Claims. (Cl. 340—384)

The present invention relates generally to techniques and apparatus for the control of animal, bird and insect nuisances and more particularly to the use of directed ultrasonic radiation for the dispersion of noxious fauna from their chosen sites.

Many unsuccessful attempts have heretofore been made to drive away noxious creatures from their chosen sites in buildings and other structures. The presence, for example, of pigeons and starlings in inaccessible nooks and ledges of a building renders the area unattractive by reason of the raucous din set up by the birds, to say nothing of their droppings. To kill or poison such birds is generally a violation of local ordinances, whereas to drive them away by destroying their nests or roosts is difficult and at best a temporary expedient. Even more difficult is the problem of rodents since their hiding places are not easily found.

Another approach to this problem has been the use of sound recordings to scare away birds and the like. For this purpose the recording may consist of cries of hostile creatures tending to frighten the birds whose presence is unwanted. But experience has shown that such methods are only temporarily effective. Moreover, the sounds are also irritating to human ears and in themselves represent a nuisance.

In view of the foregoing, it is the principal object of this invention to provide an effective technique for scaring away noxious fauna, which technique is in no way disturbing to human beings.

More specifically it is an object of the invention to produce ultrasonic radiation so directed and of an intensity acting to disperse noxious fauna from a given area.

Also an object of the invention is to provide an ultrasonic transducer capable of producing a highly directional beam of wave energy.

For a better understanding of the invention as well as other objects and further features thereof, reference is had to the following detailed description to be read in conjunction with the accompanying drawing, wherein like components in the various views are identified by like reference numerals.

Figure 1:
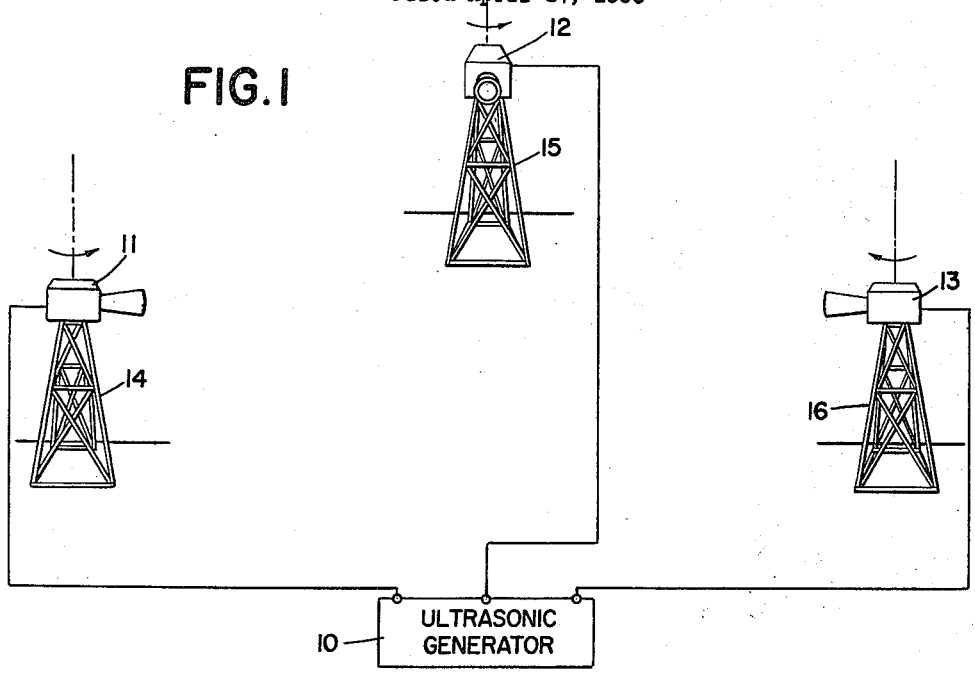
Figure 1 is a schematic view of an ultrasonic radiating arrangement in accordance with the invention.

Referring now to the drawing and more particularly to Fig. 1, there is shown an arrangement for dispersing noxious fauna from a given area, the arrangement comprising an ultrasonic generator 10 and a plurality of transducers 11, 12 and 13 coupled thereto.

The generator 10 may be constituted by an oscillator of any standard design operating in the range of 10,000 to 100,000 cycles per second, but preferably between 15,000 to 30,000 cycles. The transducers 11, 12 and 13, driven by generator 10, are of highly directional design and are mounted on bases or towers 14, 15 and 16, respectively. The towers or bases may be situated at various locations in the field or building remote from the generator 10 which may be placed at a central site.

Each transducer is preferably caused to reciprocate on its tower to scan a given sector, say 30° in azimuth and 10° in elevation to project an ultrasonic beam intercepting noxious creatures within the boundaries of the sector. The intensity of radiation may be adjusted so that the scanning beam is effective for about 100 yards or more. The number and locations of the several transducers will of course depend on the area from which the fauna are to be driven away. Alternatively a transducer may be mounted on a single tower and caused to scan omni-directionally.

It has been found that when birds, mice and other fauna are subjected to ultrasonic radiation, the wave energy is highly disturbing and serves to drive away the creatures from the region of the radiation. One factor thought to account for the irritating effect is the heating of the fur or feathers of the animal by reason of ultrasonic energy. Another factor is the effect of ultrasonic radiation on the aural systems of fauna which in many instances are responsive well above the range of human hearing. In any event human beings are in no way annoyed by the radiation whereas it has a highly disturbing influence on fauna and serves rapidly to drive them away from the effective region of radiation.

Figure 2:
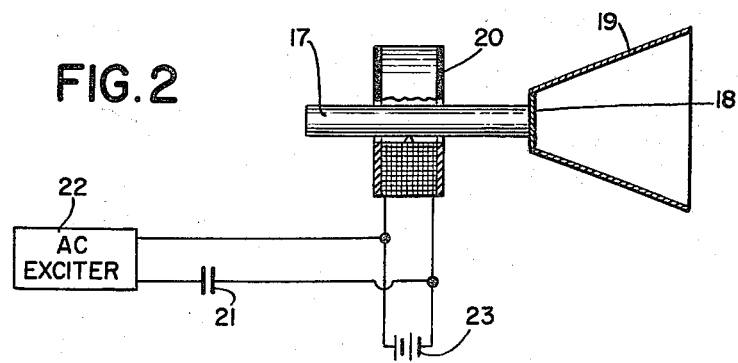
Figure 2 is a sectional view of a transducer in accordance with the invention.

A preferred form of horn type transducer is shown in Fig. 2 and comprises a magnetostrictive unit 17 which may be of rod, tube or lamination form rigidly mounted at its center in the usual manner. Secured to the end of the magnetostrictive unit 17 is a diaphragm 18 coupled to the mouth of a conical horn 19. Surrounding the magnetostrictive unit is a coil 20 which is connected through a coupling capacitor 21 to an alternating current exciter circuit 22 of any suitable design. To apply direct-current bias to the coil, a battery 23 or any other D.-C. source is provided. The A.-C. exciter may consist of an oscillator in combination with an amplifier, the coupling capacitor serving to isolate the exciter from the D.-C. source.

If diaphragm 18 is relatively small, the wave length will be comparatively large with respect to the diaphragm and will produce a non-directional wave; the horn 19 therefore serves to direct the wave into a sharp beam. While it is possible to make a diaphragm which is comparatively large with respect to wave length, this would involve a more elaborate structure. Though a larger diaphragm would be more directional in its characteristics, at the same time it would be more difficult to produce a suitable horn therefor, and the frequency range would be limited by the horn.

Figure 3:
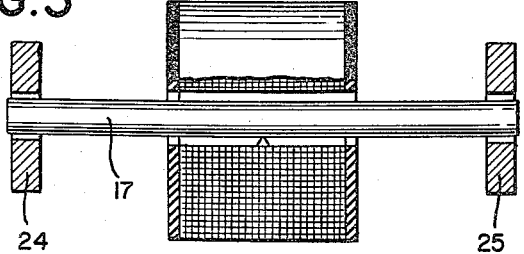
Figure 3 is a modified form of transducer.

In place of the direct-current, bias, permanent magnet rings, such as rings 24 and 25, may be disposed at either side of the magnetostrictive rod to polarize same magnetically, as illustrated in Fig. 3.

The mass of the diaphragm is not sufficiently great to change the center of vibration, the transducer being rigidly mounted at the center at a nodal point on the vibratory rod. Units of this type can readily be constructed to operate up to about 40,000 cycles, above which point the physical dimensions of the rod become too small for easy handling. In place of magnetostrictive transducers, a crystal loud speaker employing a barium titanate element may be used, in which event no direct-current bias is required.

The present invention makes possible a relatively inexpensive installation which assures the control and eliminations of animal, bird and insect nuisances from building structures and similar sites where such nuisances tend to congregate. The apparatus is highly effective in driving away such nuisances for prolonged periods.

With a multi-transducer arrangement as disclosed in Fig. 1, it is also possible to operate the respective transducers at different frequencies. For example, a group of transducers may be coupled to a first generator operating at 20,000 cycles while another group is coupled to a second generator simultaneously operating at 30,000 cycles or some other frequency. In this way not only would each of these frequencies be present but beat frequencies due to combinations of these frequencies. Moreover, the ultrasonic generator might be modulated in frequency during the time of transmission or it might be pulsed or amplitude modulated.

While there has been shown what is considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Apparatus for dispersing noxious fauna comprising a common ultrasonic generator disposed at a central location, a plurality of ultrasonic transducers coupled to said generator, each transducer being adapted to produce an ultrasonic beam, and means to direct said ultrasonic beam toward the expected location of said noxious fauna including means to reciprocate said transducers to scan given sectors in azimuth and elevation.

2. Apparatus, as set forth in claim 1, wherein said transducers operate in a range of about 15,000 to 30,000 cycles.

3. Apparatus, as set forth in claim 1, wherein each of said transducers is mounted for reciprocal motion to scan one of said given sectors and is constituted by a magnetostrictive element, an exciter coil surrounding said element and coupled to said generator, a diaphragm secured to one end of said element, and a radiating horn coupled to said diaphragm to produce said ultrasonic beam.

4. Apparatus, as set forth in claim 1, wherein said sector is approximately 30 degrees and said elevation is approximately 10 degrees.

References Cited in the file of this patent

UNITED STATES PATENTS

| | | |
|---|---|---|
| 1,750,124 | Pierce | Mar. 11, 1930 |
| 1,882,394 | Pierce | Oct. 11, 1932 |
| 2,064,911 | Hayes | Dec. 22, 1936 |
| 2,249,835 | Lakatos | July 22, 1941 |
| 2,328,496 | Rocard | Aug. 31, 1943 |
| 2,345,472 | Goldsmith | Mar. 28, 1944 |
| 2,414,495 | Vang | Jan. 21, 1947 |
| 2,490,273 | Kean | Dec. 6, 1949 |
| 2,596,678 | Gross | May 13, 1952 |

OTHER REFERENCES

"Army Engineers Kill Mice With New Sonic Wave," in Washington Times-Herald newspaper, November 30, 1947.